United States Patent
Khotimsky et al.

(10) Patent No.: US 10,063,411 B2
(45) Date of Patent: Aug. 28, 2018

(54) CHANNEL MAP FOR OPTICAL NETWORK UNIT ACTIVATION AND ROGUE BEHAVIOR PREVENTION

(71) Applicants: ZTE Corporation, Shenzhen (CN); ZTE (USA) Inc., Richardson, TX (US)

(72) Inventors: Denis Andreyevich Khotimsky, Westborough, MA (US); Dan Geng, Shanghai (CN); DeZhi Zhang, Shanghai (CN); LiQuan Yuan, Shanghai (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 3 days.

(21) Appl. No.: 14/770,799

(22) PCT Filed: Feb. 26, 2014

(86) PCT No.: PCT/CN2014/072582
§ 371 (c)(1),
(2) Date: Aug. 26, 2015

(87) PCT Pub. No.: WO2014/131352
PCT Pub. Date: Sep. 4, 2014

(65) Prior Publication Data
US 2016/0006608 A1    Jan. 7, 2016

(30) Foreign Application Priority Data
Feb. 26, 2013  (WO) ................ PCT/CN2013/071891

(51) Int. Cl.
H04B 10/27    (2013.01)
H04J 14/00    (2006.01)
(Continued)

(52) U.S. Cl.
CPC ........ *H04L 41/0806* (2013.01); *H04J 14/026* (2013.01); *H04J 14/0246* (2013.01);
(Continued)

(58) Field of Classification Search
CPC .. H04J 14/026; H04J 14/0282; H04J 14/0256; H04J 14/0246; H04J 14/0272;
(Continued)

(56) References Cited

U.S. PATENT DOCUMENTS 5,144,467 A * 9/1992 Kitajima ................ H04B 10/60
398/203
8,331,783 B2 * 12/2012 Ikai ......................... H04J 14/02
398/69

(Continued)

FOREIGN PATENT DOCUMENTS

| CN | 101321017 A | 12/2008 |
| CN | 102870037 A | 1/2013 |
| WO | 2012/136155 A1 | 10/2012 |

OTHER PUBLICATIONS

Hood et al, Gigabit Capable Passive Optical Networks, 2012, Wiley Publisher, pp. 166-169.*

(Continued)

*Primary Examiner* — Ken N Vanderpuye
*Assistant Examiner* — Dibson Sanchez
(74) *Attorney, Agent, or Firm* — Perkins Coie LLP

(57) ABSTRACT

A multi-wavelength passive optical network (MW-PON) includes an optical distribution network (ODN), a plurality of optical line terminations (OLTs) and an optical network unit (ONU). The ODN includes a trunk fiber, one or more branching elements, and a plurality of distribution fibers. Each OLT is associated with an individual bi-directional wavelength channel using a corresponding single downstream wavelength and a corresponding single upstream (Continued)

wavelength, and supporting a specific downstream line rate and one or more distinct upstream line rates. The ONU is communicatively coupled to a respective distribution fiber, being tunable over a specific range of downstream wavelengths and a specific range of upstream wavelengths, and supporting a specific downstream line rate and a specific upstream line rate. The OLT is configured to assemble a broadcast management message conveying information about bi-directional wavelength channels in said MW-PON system and transmit said message downstream over the associated bi-directional wavelength channel.

12 Claims, 11 Drawing Sheets

(51) Int. Cl.
*H04L 12/24* (2006.01)
*H04Q 11/00* (2006.01)
*H04J 14/02* (2006.01)

(52) U.S. Cl.
CPC ...... *H04J 14/0256* (2013.01); *H04J 14/0272* (2013.01); *H04J 14/0282* (2013.01); *H04Q 11/0067* (2013.01); *H04J 2014/0253* (2013.01); *H04Q 2011/0079* (2013.01); *H04Q 2011/0086* (2013.01)

(58) Field of Classification Search
CPC ......... H04J 2014/0253; H04Q 11/0067; H04Q 11/0079; H04Q 2011/0086; H04L 41/0806
USPC .......................................... 398/58–64, 66–73
See application file for complete search history.

(56) References Cited

U.S. PATENT DOCUMENTS

| | | | | |
|---|---|---|---|---|
| 9,112,600 | B2* | 8/2015 | Lee | H04B 10/07 |
| 2006/0067691 | A1* | 3/2006 | Hirano | H04J 3/1694 398/71 |
| 2007/0092256 | A1 | 4/2007 | Nozue et al. | |
| 2007/0098406 | A1 | 5/2007 | Bernard et al. | |
| 2008/0138072 | A1* | 6/2008 | Sakamoto | H04J 14/0226 398/68 |
| 2008/0166127 | A1* | 7/2008 | Kazawa | H04J 14/025 398/79 |
| 2008/0267627 | A1* | 10/2008 | Effenberger | H04B 10/272 398/72 |
| 2008/0304828 | A1 | 12/2008 | Mizutani et al. | |
| 2009/0067838 | A1* | 3/2009 | Chen | H04N 7/22 398/58 |
| 2010/0158527 | A1 | 6/2010 | Mizutani et al. | |
| 2010/0221007 | A1* | 9/2010 | Sakamoto | H04J 14/0226 398/67 |
| 2011/0236017 | A1* | 9/2011 | Ohlen | H04J 14/0282 398/34 |
| 2012/0008958 | A1* | 1/2012 | Dahlfort | H04J 14/0282 398/85 |
| 2012/0183297 | A1* | 7/2012 | Rohde | H04B 10/0731 398/90 |
| 2012/0315040 | A1* | 12/2012 | Dahlfort | H04J 14/0246 398/58 |
| 2013/0034356 | A1* | 2/2013 | Luo | H04B 10/272 398/72 |
| 2013/0094862 | A1* | 4/2013 | Luo | H04J 14/0278 398/68 |
| 2014/0050479 | A1* | 2/2014 | Luo | H04J 14/02 398/68 |
| 2014/0161461 | A1* | 6/2014 | Lee | H04J 3/0682 398/79 |
| 2014/0233953 | A1* | 8/2014 | Giorgi | H04J 14/0227 398/68 |
| 2014/0294391 | A1* | 10/2014 | Tamaki | H04L 12/12 398/68 |
| 2015/0037027 | A1* | 2/2015 | Froc | H04B 10/0795 398/25 |
| 2015/0055957 | A1* | 2/2015 | Lee | H04J 14/0227 398/79 |
| 2015/0098704 | A1* | 4/2015 | Gao | H04J 14/0246 398/68 |
| 2015/0104199 | A1 | 4/2015 | Ye et al. | |
| 2015/0125149 | A1* | 5/2015 | Gao | H04J 14/0246 398/58 |
| 2015/0125153 | A1* | 5/2015 | Lee | H04B 10/0793 398/79 |
| 2015/0207585 | A1* | 7/2015 | Luo | H04J 14/0256 398/72 |
| 2015/0222440 | A1 | 8/2015 | Khotimsky et al. | |
| 2015/0318929 | A1* | 11/2015 | Gao | H04J 14/0236 398/72 |
| 2015/0341137 | A1* | 11/2015 | Kaneko | H04B 10/272 398/67 |
| 2015/0365191 | A1* | 12/2015 | Lee | H04J 14/0246 398/67 |
| 2015/0365192 | A1* | 12/2015 | Kim | H04J 14/0256 398/66 |
| 2015/0381306 | A1* | 12/2015 | Wu | H04B 10/0773 398/67 |
| 2016/0020868 | A1* | 1/2016 | Lee | H04J 14/023 398/58 |
| 2016/0080105 | A1* | 3/2016 | Khotimsky | H04J 14/0232 398/34 |
| 2016/0373207 | A1* | 12/2016 | Kim | H04J 14/0282 |

OTHER PUBLICATIONS

Asaka, K., et al., "Proposal for a listing of examples of ODN's to extract the resulting logical topologies," International Telecommunication Union, 2(15):1-5, Feb. 2013.

European Search Report dated Dec. 22, 2015 for European Patent Application No. 14756303.5, filed on Sep. 23, 2015 (10 pages).

International Search Report and Written Opinion dated May 9, 2014 for International Application No. PCT/CN2014/072582, filed on Feb. 26, 2014 (3 pages).

ITU-T Telecommunication Standardization Sector of ITU, "10-Gigabit-capable passive optical network (XG-PON) systems: Definitions, abbreviations and acronyms," International Telecommunication Union, G.987, 24 pages, Jun. 2012.

Khotimsky, D., et al., "ONU activation in TWDM-PON systems," International Telecommunication Union, Q2 (15):1-6, Feb. 2013.

Liang, Z., et al., "New PLOAM message for wavelength configuration in MW-PON system," International Telecommunication Union, Q2(15):1-7, Feb. 2013.

Luo, Y., et al., "Draft new Recommendation ITU-T G.multi," International Telecommunication Union, 2(15):1-14, Feb. 2013.

* cited by examiner

| Octets | Field | Details |
|---|---|---|
| 1–2 | ONU-ID | |
| 3 | Message type | |
| 4 | SeqNo | |
| 5 | Version Control | |
| | Total Channel Number | 4 or 8: 1 bit |
| | Current Channel ID | 3 bit |
| | Channel Map<br>...<br>CIX \| UWL \| DWL \| ULR \| DLR \| AF<br>... | At most 8 times 3 octets:<br>CIX: 3 bits<br>UWL, DWL: reference to a well-defined list<br>DLR: 10 or 2.5 (1 bit)<br>ULR: 10 and/or 2.5 (2 bits)<br>AF: 1 bit |
| | Padding | |
| 41–48 | MIC | |

Content Size estimate: 25 octets (of 35 available)

FIG. 5B

CHANNEL MAP FOR OPTICAL NETWORK UNIT ACTIVATION AND ROGUE BEHAVIOR PREVENTION

PRIORITY CLAIM

This PCT application claims, under the Paris Convention, the priority of prior Chinese patent application filed under a PCT application number PCT/CN2013/071891 of the same title of "CHANNEL MAP FOR OPTICAL NETWORK UNIT ACTIVATION AND ROGUE BEHAVIOR PREVENTION" which was filed at SIPO on Feb. 26, 2013.

BACKGROUND

The present document relates to multi-wavelength passive optical networks (MW-PONs).

Presently, many passive optical data communications systems transmit signals between endpoints using a single wavelength for transmission. With the ever-increasing demand on the amount of data that can be carried over an existing fiber optic network, network operators have begun using multiple wavelengths for transmitting data over their networks.

The use of multiple optical wavelengths poses additional operational issues, including activation of an optical network unit (ONU) in the network and preventing rogue behavior of ONUs.

SUMMARY

Techniques are described for activating a plurality of the optical network units (ONUs) on a multi-wavelength passive optical network (MW-PON) system, where individual ONUs maybe characterized by different wavelength tuning ranges and different nominal upstream and downstream bitrates. In one advantageous aspect, the presently disclosed techniques prevent rogue transmissions by activated ONUs on incorrect wavelength channels.

In one exemplary aspect, a multi-wavelength passive optical network (MW-PON) includes an optical distribution network (ODN), a plurality of optical line terminations (OLTs) and one or more optical network units (ONUs). The ODN includes a trunk fiber, one or more branching elements, and a plurality of distribution fibers. Each OLT is associated with an individual bi-directional wavelength channel using a corresponding single downstream wavelength and a corresponding single upstream wavelength, and supporting a specific downstream line rate and one or more distinct upstream line rates. The ONU is communicatively coupled to a respective distribution fiber, being tunable over a specific range of downstream wavelengths and a specific range of upstream wavelengths, and supporting a specific downstream line rate and a specific upstream line rate. The OLT is configured to assemble a broadcast management message conveying information about bi-directional wavelength channels in said MW-PON system and transmit said message downstream over the associated bi-directional wavelength channel.

In another aspect, a method of activating an optical network unit (ONU) in an optical domain network (ODN) is provided to include operating the ONU to perform a tuning range scanning, a channel map acquisition, a parameter learning, a discovery, and a ranging, wherein the content of the parameter learning, discovery, and ranging is largely identical to the content of the respective activation phase in a single-channel PON system such as a system under G.984 G-PON or G.987 XG-PON.

In another aspect, a method is implemented at an optical network unit (ONU) for joining an optical distribution network (ODN) and includes tuning to a channel; attempting to receive a channel map message on the tuned channel, the channel map message comprising information about an activation channel; tuning, when the received channel map message includes information about a compatible activation channel, to the compatible activation channel; and acquiring channel map message and a profile on the compatible activation channel.

In another aspect, an optical network unit is provided to include a tuner module that tunes to a working optical channel; a channel map receiver module that attempts to receive a channel map message on the tuned channel, the channel map message comprising information about an activation channel; an activation channel module that tunes, when the received channel map message includes information about a compatible activation channel, to the compatible activation channel; and a parameter acquisition module that acquires channel map message and a profile on the compatible activation channel.

In yet another aspect, an optical communication equipment for operation in an optical communication network is provided to include a channel map module configured to generate a channel map for inclusion in a channel map message, the channel map listing activation channels available in the optical communication network; and a channel map transmitter configured to periodically transmit the channel map message in a downstream direction in the optical communication network.

These, and other features are disclosed with reference to the drawings, the detailed description and the claims.

BRIEF DESCRIPTION OF THE DRAWINGS

FIG. 5B illustrates another Channel_Map management message example.

DETAILED DESCRIPTION

Figure 1:
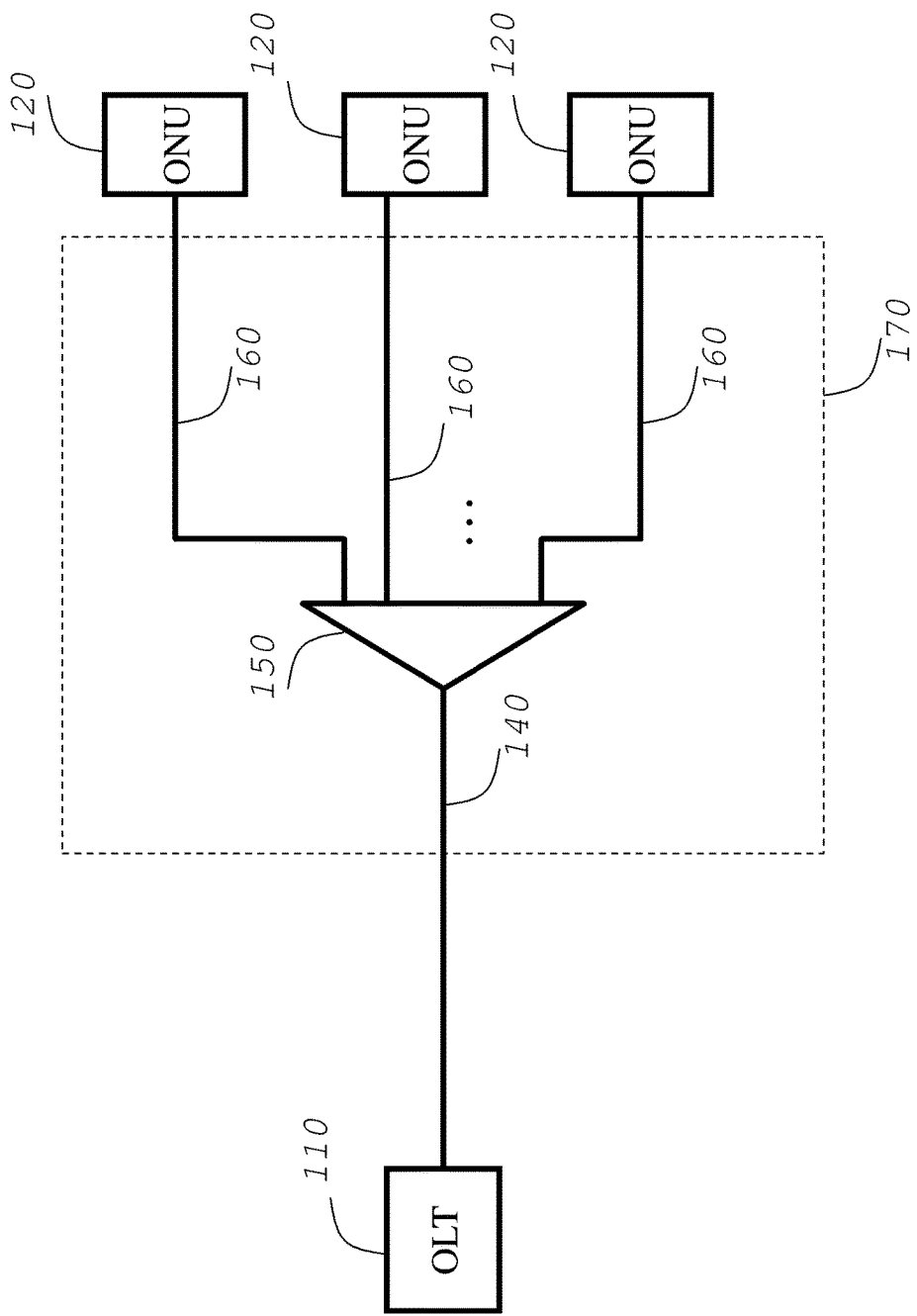
FIG. 1 shows a typical single-channel time domain multiplexed (TDM) passive optical network (PON) system.

A passive optical network (PON) is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called optical network units (ONUs) via a passive optical distribution network (ODN). An ONU can be located at or near the access user's premises. An OLT can be located at the access provider's communication facility (central office). In a conventional PON based on time-division multiplexing/time-division multiple access (TDM/TDMA) principles, such as G.984 G-PON or G.987 XG-PON, the OLT operates on a single downstream wavelength to send information to one or more ONUs in the PON and on a single upstream wavelength to receive information from one or more ONUs. In a typical existing PON, a plurality of the ONUs connected to the OLT over the ODN share the same downstream and same upstream wavelength.

When an ONU joins or resumes operations on a conventional TDM PON system, it has to undergo activation. Activation typically includes a set of distributed procedures executed by the OLT and the ONU and comprising the phases of parameter learning, serial number acquisition (discovery), and ranging. The activation procedure is facilitated by the OLT regularly broadcasting relevant operational parameters and, from time to time, suppressing the transmissions of the active traffic flows on the PON and opening a quite window in which the activating ONUs are able to announce themselves so that the OLT is able to discover and range such ONUs.

The process generally outlined above is implemented in various single wavelength ONUs currently deployed in the field.

In a multi-wavelength passive optical network (MW-PON), multiple OLTs each operating on a unique downstream wavelength and unique upstream wavelength are connected to one and the same optical distribution network (ODN) via a wavelength multiplexor (WM), and over the said ODN are connected to a plurality of ONUs. A combination of one downstream wavelength and one upstream wavelength associated with a given OLT forms a bi-directional wavelength channel. Multiple downstream wavelengths reach each ONU; however, each ONU is typically configured for receiving and processing only one downstream wavelength and to generate only one upstream wavelength at any given time. An ONU may be designed to operate on a specific pair of downstream and upstream wavelengths, in which case it is a fixed ONU, or it may be capable of changing its downstream and upstream wavelength in time, in which case it is tunable ONU.

Depending on the operational considerations, the number of OLTs connected to the ODN via the WM can vary. Then the number of bi-directional wavelength channels present on the ODN varies accordingly. Each bi-directional wavelength channel is associated with one downstream line rate (measured in bits per second) and one or more upstream line rates. The line rates associated with each bi-directional wavelength channel may vary from one channel to another either in both or only in one direction.

Each ONU operating on a MW-PON system can be tunable over a range of wavelengths. Each ONU, however, is characterized by a fixed downstream and fixed upstream line rate. Therefore, only a subset of wavelength channels present on the ODN of the MW-PON can be physically reachable by a given ONU, and of those wavelength channels only a subset can support the line rate combination of the ONU and, therefore, be available to a given ONU operationally.

Among the wavelength channels whose downstream line rate matches the operational downstream line rate of a given ONU, there could be wavelength channels whose supported upstream line rate sets include the ONU's operational upstream line rate, but also those wavelength channels whose supported upstream line rate sets do not include the ONU's operational upstream line rate. If an ONU whose operational downstream line rate matches the line rate of the wavelength channel, but whose operational upstream line rate is not supported by the wavelength channel attempts to transmit on that channel, it may become a rogue ONU disturbing the operation of the wavelength channel.

A variety of techniques are possible to support ONU activation on a MW-PON.

One such technique calls for a predefined activation channel to be known to the ONU in advance. The ONU that undergoes activation tunes to the pre-defined channel, acquires the downstream transmission from the OLT associated with that channel, and awaits the appropriate allocation from the OLT to initiate the activation. A disadvantage of the first technique is manifested in situation when the predefined activation wavelength channel is not available due to operational consideration, or when the OLT associated with the pre-defined activation channel is temporarily out-of-order, and, therefore, the ONU is blocked indefinitely on acquisition of the downstream transmission.

The second technique is activation of OLTs in a MW-PON system and is implemented based on an extension of a single-channel TDM-PON system. Each OLT in a MW-PON system offers activation independently from the other OLTs. This implies that an ONU can activate on whatever wavelength channel it happens to initialize without a need for retuning, but that each OLT port has to opens frequent quiet windows for ONU discovery and ranging at the expense of bandwidth efficiency and QoS experienced by the active flows.

A third technique is related to an operation during ONU's activation: an ONU presents its wavelength and tunability report to the OLT; the OLT issues a wavelength assignment command to the ONU instructing the ONU to either maintain the current wavelength or to tune to the target wavelength. The fact that the OLT sends a directed wavelength assignment command may suggest that at that time the activation (discovery and ranging) has been completed. Then it remains unspecified how the ONU selects the upstream wavelength and timeslot to transmit the tunability report. Alternatively, the third technique can be modified to allow the ONU to send the tunability report in a contention-based window during activation in a initialization wavelength. This modification require all the OLTs of MW-PON to open frequent quiet windows on all wavelength channels that an ONU may initialize in (in effect, on all available wavelength channels). The need for frequent quiet windows and partial execution of the activation procedures on all channels adversely impacts bandwidth efficiency and the service provided to active traffic flows.

A fourth technique designates one OLT as the domain controller (DC). The DC regularly transmits a domain advertisement that specifies the upstream activation wavelength and validity time. An ONU that is an activation candidate tunes to its domain controller's downstream wavelength which is known from standardization, configuration, or through scanning. Once the ONU receives the advertisement, it retunes to the specified activation wavelength channel and responds to the grant according to the grant parameters, whereupon the DC completes the basic activation of the ONU and reassigns it to its operating host OLT wavelength. The fourth activation technique allows to reduce the activation overhead, but requires two or more retuning steps (from the initialization channel to the advertisement channel to the activation channel, the former may involve multiple retuning steps if scanning is required). Furthermore, the fourth technique does not allow an ONU to communicate its supported wavelength set and requires specification of the extra mitigation action to address the case when the advertisement channel becomes unavailable.

The presence of a large number of ONUs that are currently deployed in the field pose an additional technical problem of ensuring backward compatibility of any new scheme introduced for the operation of MW-PON ONUS. For example, one technical issue relates to how to operate legacy ONUS in a MW-PON. If the MW-PON architecture is not carefully designed, then legacy ONUS may create detrimental impact on MW-PON. For example, legacy ONUS may have to be separated out so that legacy ONUS and new ONUS do not share the same wavelengths—making such solution sub-optimal. In another scenario, legacy ONUS may attempt to transmit in the upstream direction, based on their legacy logic, causing undesirable interference with transmissions from MW-PON ONUS (rogue ONU scenario). A third possible scenario would be when a MW-PON is deployed in a legacy single wavelength network, the MW-PON may operate in a sub-optimal manner. Yet another technical issue relates to the complexity of changes to be made to legacy ONUS (e.g., software code changes) to update legacy ONUS to become compatible and operational in a MW-PON system. From an operational perspective, it may be desirable to have minimum or no changes performed to the operation the legacy ONU that generally understands only a single wavelength operation. However, as discussed above, presently available technologies fail to adequately solve these operational issues.

The techniques presented in this document provide solutions for the above-discussed technical problems and others.

An effective ONU activation procedure has to be defined that allows an ONU to join the operations on a MW-PON system selecting one of the physically reachable and operationally available wavelength channels while preventing ONU upstream transmission on an incorrect wavelength channel.

In the most general case, the context of the disclosed techniques includes the following characteristic features.

A MW-PON system operates on a set of bi-directional wavelength channels whose wavelengths are drawn from a pre-defined or standardized set (such as the ITU-T DWDM grid).

Each bi-directional wavelength channel of the MW-PON is characterized by the supported protocol, the supported downstream line rate, and one or more supported upstream line rates;

Each individual bi-directional wave-length channel may be temporarily unavailable due to failure or operational considerations;

An ONU is characterized by a tuning range that includes one or more of wavelength channels in the said pre-defined set, the supported protocol, the supported downstream line rate, and supported upstream line rate.

An ONU is initialized on an arbitrary wavelength channel within its tuning range.

The disclosed techniques do not fix the ONU activation wavelength and does not require the ONU to have any prior knowledge of how the supported wavelength channels on the MW-PON are allocated to protocols and line rates. The present disclosure limits the attention to the case when the ONU under activation shares the supported protocol with one or more wavelength channels of the MW-PON system.

One example of a TDM/TDMA PON system is illustrated in FIG. 1 and includes a single OLT 110 and a plurality of ONUS 120 interconnected by an optical distribution network (ODN) 170 that includes optical feeder fiber or trunk fiber 140, a splitter 150 as a branching element coupled to the trunk fiber 140 to split the light in the trunk fiber 140 into multiple beams, and multiple distribution fibers 160 coupled to the splitter 150 to receive the multiple beams, respectively. Such PON systems support a single bi-directional wavelength channel offering unique downstream and unique upstream line rates. All ONUS 120 support fixed downstream and upstream wavelengths and a fixed combination of downstream and upstream line rates. Once an ONU starts activation on the PON, there is a unique OLT that corresponds to the ONU and interacts with the ONU, and there is decision to make whether the wavelength channel the OLT supports is appropriate for activation. Prior to transmitting upstream in such a system, an ONU has to learn the parameters of the upstream burst, such as the preamble and delimiter sizes and patterns, that the OLT regularly sends in a downstream broadcast management message.

Figure 2:
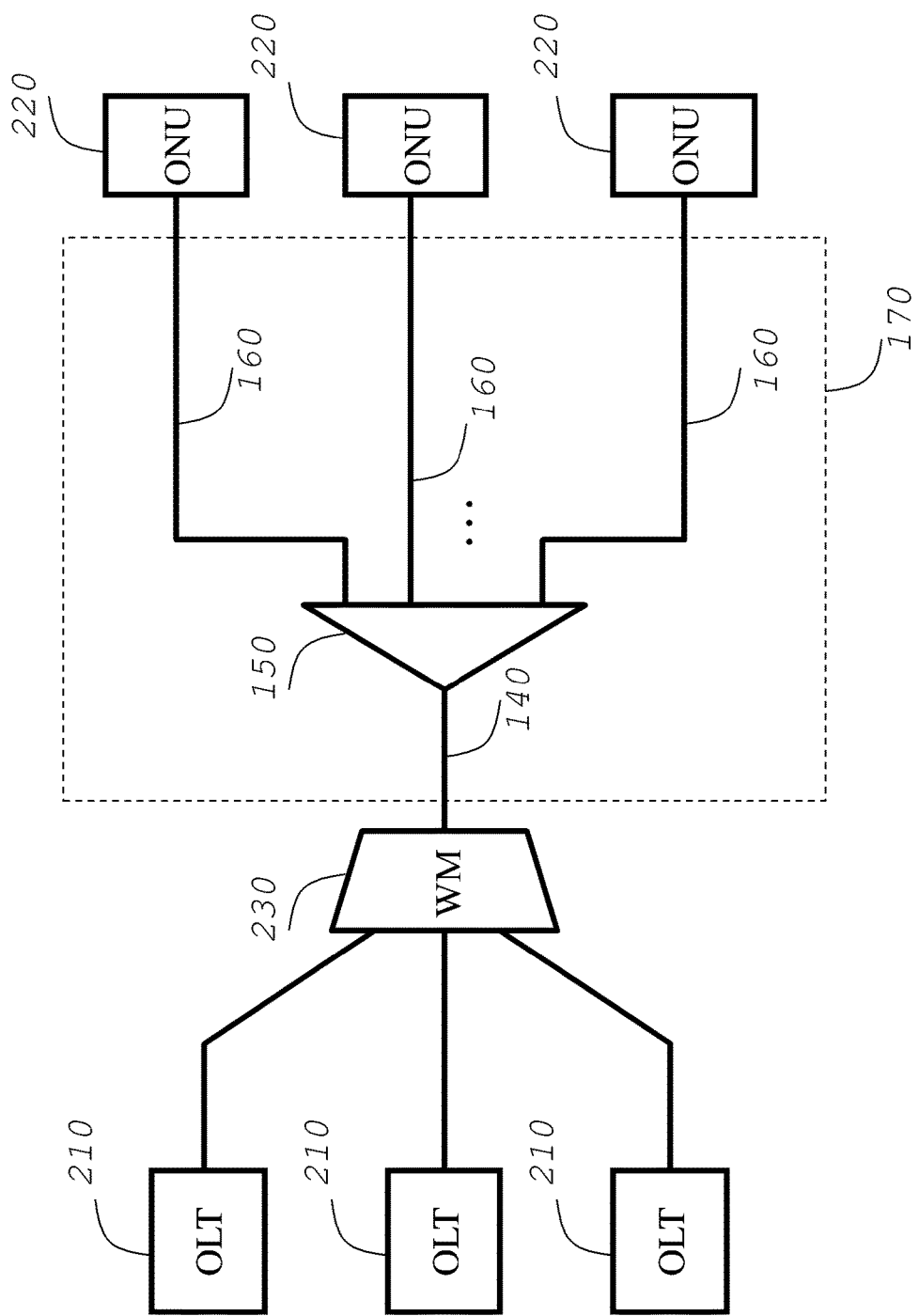
FIG. 2 shows a typical multi-wavelength PON system where multiple optical line terminals (OLTs) are connected to the conventional ODN via a wavelength multiplexor.

In a MW-PON system shown in FIG. 2, several OLTs 210 each associated with its own wavelength channel are attached to the ODN via the wavelength multiplexor (WM) 230 which is coupled between the OLTs 210 and one end of the trunk fiber 140 which is coupled to the splitter 150 at the other end. The WM 230 coupled between the OLTs 210 and the trunk fiber 140 is used to combine downstream light beams from the OLTs 210 into the trunk fiber 140 and to split upstream light from truck fiber 140 into different upstream light beams to the OLTs 210. Out of the OLTs that support the common protocol (such as TDM/TWDM), different OLTs may support different downstream and upstream line rates. The MW-PON ONUS 220 could be fixed or tunable in their wavelengths and are connected to the WM 230 and MW-PON OLTs 210 over ODN 170, which, in some implementations, may remain essentially the same as in the case of conventional TDM PON system.

Figure 3:
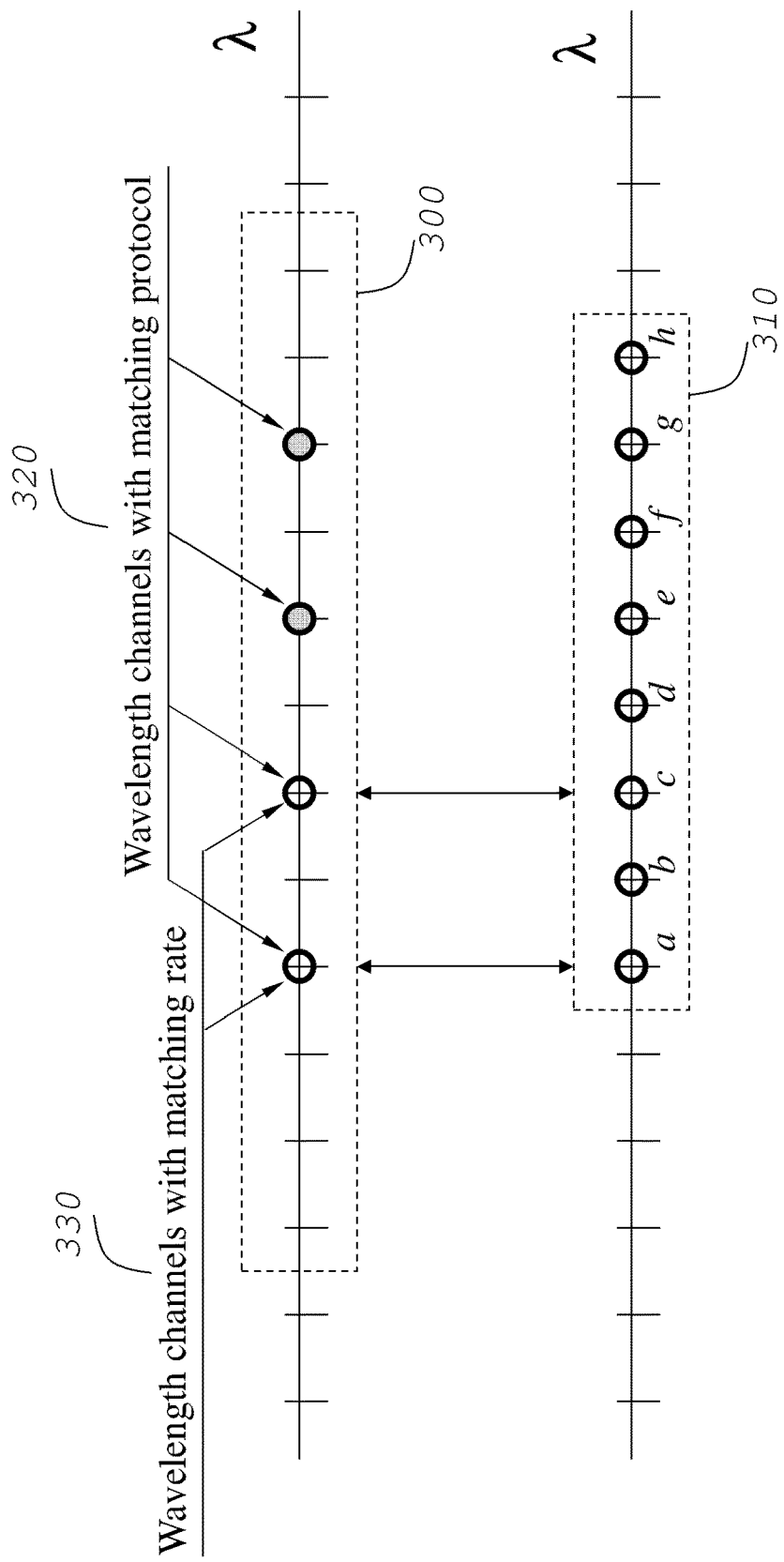
FIG. 3 illustrates wavelength matching in a MW-PON system.

As exemplified in FIG. 3, the tuning range 310 of a given MW-PON ONU 220 may include several of the wavelength channels supported by the MW-PON OLTs. In the example, these are channels (a) through (h). Among the wavelength channels that belong to the set 300 of the channels supported by the MW-PON OLTs and also belong to the tuning range 310 of a given MW-PON ONU, only a subset 320 of channels may support the protocol matching the protocol of the ONU, and only the subset 330 of the set 320 may support the line rates supported by the ONU. In the example of FIG. 3, the ONU can operate on the MW-PON system only on wavelength channels (a) and (c).

Figure 4:
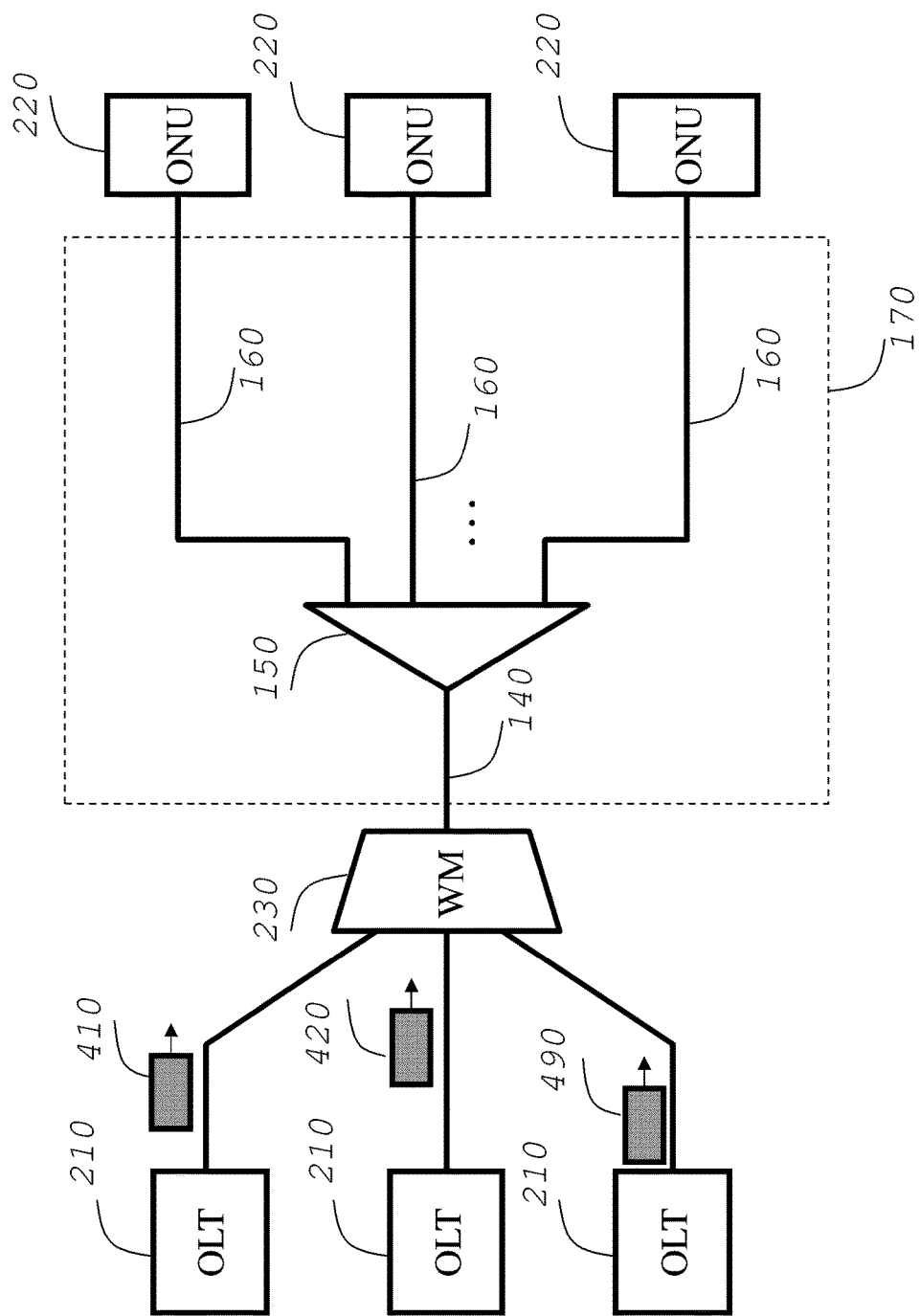
FIG. 4 depicts an MW-PON system with broadcast management messages transmitted downstream.

In distinction from the present day technologies, according to the present document, the OLTs of the MW-PON system support ONU activation on an arbitrary channel with the tuning range of each ONU by transmitting a management message herein referred as Channel_Map on all supported wavelength channels that support the common protocol with the ONU. FIG. 4 is an example of a pictorial depiction of the transmission of Channel_Map as a downstream broadcast management message. Substantially identical copies of each (410, 420, 490) are transmitted on different wavelength channels. The Channel_Map transmissions are periodic or nearly periodic, but not synchronized between the different wavelength channels. Also, because the downstream line rate for each OLT 210 may be different, the actual transmission time occupied by the channel maps 410, 420, 490 may be different (e.g., channel map is transmitted in fewer microseconds on a channel with higher downstream rate, compared to another channel with a lower downstream rate). Among other things, the channel map conveys to a receiving ONU the possible activation channels that the ONU can use to activate itself in the ODN.

Figure 5A:
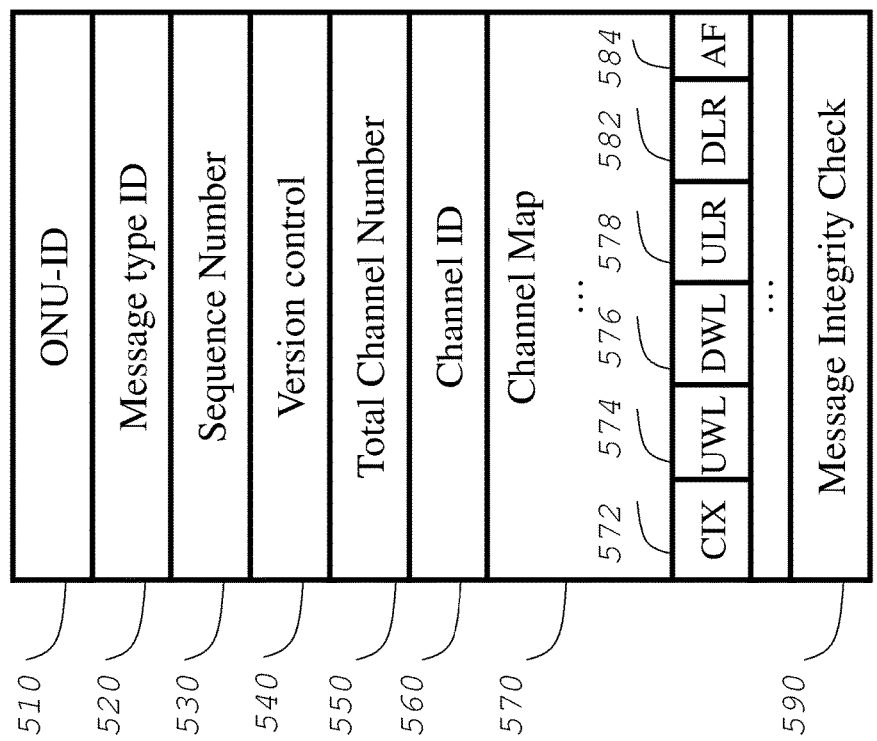
FIG. 5A illustrates an example of a Channel_Map management message in a MW-PON system.

The substantial content of the Channel_Map message is disclosed in FIG. 5A in a bit-, order- and size-invariant form. The ONU-ID field 510 identify the message as a broadcast message to all ONUS attached to a given bi-directional wavelength channel and receiving the downstream transmission from the OLT. This is a common part of a management message in a PON system, which is not specifically disclosed in the present technology. The Message type ID field 520 identifies the message to be of the Channel_Map type and to have a specific content as disclosed herein. The Sequence Number field contains the information commonly used to improve the robustness of the management channel in a PON system, and is not specifically disclosed in the present document. The Version control field 540 is used to track the temporal changes in contents of the message. This is common part of the of a management message in a PON system, which is not specifically disclosed in the present document. The Total Channel Number field 550 specifies the number of wavelength channels supported on the MW-PON system that also share the common protocol with the ONUS. The value carried in the field 550 identifies the number of entries the Channel Map array 570. The Channel ID field (560) is the identifier of the current wavelength channel referencing the CIX subfield of the Channel Map array. This is the only field of the Channel Map message body that varies depending on which wavelength channel the message is transmitted. Each record entry in the Channel Map array 570 contains the following subfields:

Wavelength channel index (CIX) 572 is the ordinal number of the record in the Channel Map array 570;

Upstream wavelength identifier (UWL) 574 uniquely identifies the upstream wavelength of the bi-directional wavelength channel;

Downstream wavelength identifier (DWL) 576 uniquely identifies the downstream wavelength of the bi-directional wavelength channel;

Upstream line rate indicator (ULR) 578 identifies the line rates supported in the upstream direction of the bi-directional wavelength channel;

Downstream line rate indicator (DLR) 582 identifies the line rate supported in the downstream direction of the bi-directional wavelength channel;

Activation Flag (AF) 584 indicates whether the wavelength channel can be used for ONU activation.

The Message integrity check 590 is field commonly used to ensure integrity and sender authentication of the management message.

One embodiment may express the UWL 554 and DWL 556 in absolute terms, whereas another embodiment may express UWL 554 and DWL in reference to a well-defined set of wavelengths.

FIG. 5B shows another example of a channel map, with the rightmost column listing possible field lengths and values in one embodiment of the disclosed technology.

Figure 6:
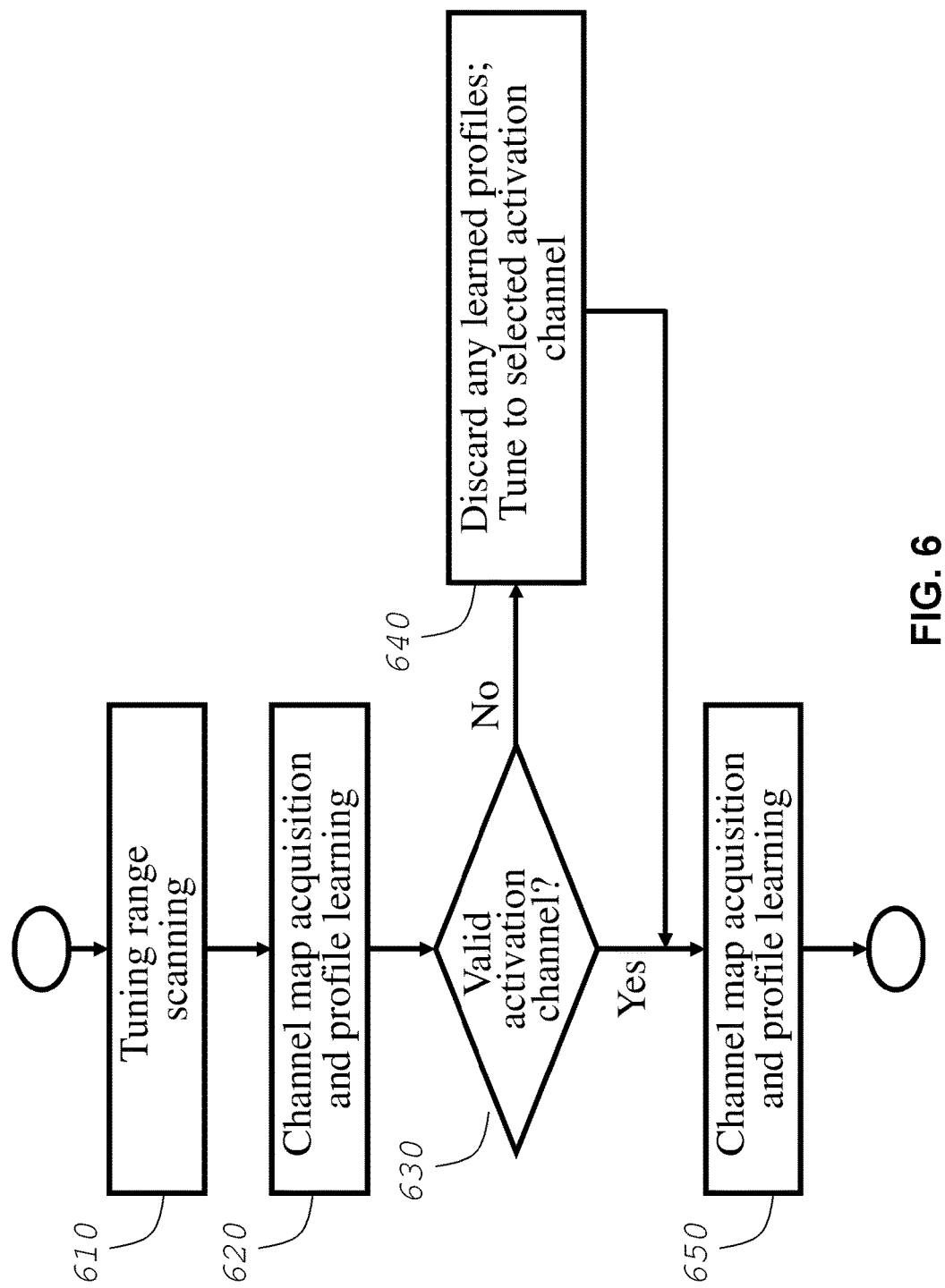
FIG. 6 is a flowchart representation of a process of the tuning range scanning, channel map acquisition, and parameter learning phases of the activation procedure in a MW-PON system.

Compared to conventional single-channel TDM PON systems, such as G.984 G-PON or G.987 XG-PON, the ONU activation procedure in a MW-PON system comprises two extra phases, in addition to parameter learning, discovery, and ranging: the phase of tuning range scanning, and the phase of channel map acquisition, which may partially overlap with the phase of parameter learning, as shown in FIG. 6. Once an ONU starts the activation procedure, it enters the procedural block 610, wherein it activates the receiver and continuously scans its tuning range in search of the valid downstream transmission signal. The ONU is able to find such signal if there exists a wavelength channel within the ONU's tuning range that is supported by the MW-PON OLTs and the supported protocol and downstream line rate of this channel match the supported protocol and downstream line rate of the ONU.

Once the ONU finds a supported channel (the initialization channel) and attains synchronization to the found downstream signal, the ONU enters procedural block 620, wherein it receives and process the downstream broadcast management messages conveying the channel map and upstream burst profile information. The channel map information is conveyed by the Channel_Map message disclosed heretofore. The upstream burst profile information is conveyed by the common message types (Upstream_Overhead and Extended_Burst_length message types of G.984 G-PON and Profile message type in G.987 XG-PON).

Once the ONU collects enough information about the initialization channel and at least one valid activation channel, it enters the decision block 630 to determine whether the initialization channel is a valid activation channel. A bi-directional wavelength channel whose downstream signal the ONU is able to receive and process is a valid activation channel for the ONU, if and only if the upstream wavelength of the channel is within the ONU's tuning range, its supported upstream line rates, specified in the Channel_Map, include the supported upstream rate of the ONU, and if the Activation Flag for the channel in the Channel_Map is set.

If the initialization channel is a valid activation channel, the ONU enters the procedural block 650, and proceeds with collecting the channel map and upstream burst profile information, until it is ready to start the discovery phase, according to the conventional procedure of a single-channel TDM PON system. The operations performed in step 650 and step 620 are similar, but different in the sense that the channel for which operational parameters are learnt at 650, would be used for actual communication and therefore these parameters will be stored in the memory until next initiation time.

If the initialization channel is not a valid activation channel, the ONU enters the procedural block 640, wherein it discards any burst profile information learned so far, selects a valid activation channel and retunes to the selected activation channel.

Once the ONU attains synchronization to the selected activation channel, the ONU enters the procedural block 650, as previously described, wherein it resumes collecting the channel map and upstream burst profile information, until the ONU is ready to start the discovery phase, according to the conventional procedure of a single-channel TDM PON system.

Since an ONU is allowed to enter the discovery phase of the activation procedure and to transmit upstream only in a valid activation channel, and since, by definition, a valid activation channel shall support the upstream line rate of the ONU, the case of rogue ONU behavior which arises when an ONU transmits on a wavelength channel with non-matching upstream line rate is excluded.

Although the ONU activation procedure in MW-PON system comprises extra phases of tuning range scanning and channel map acquisition, compared to a conventional single-channel PON system, the disclosed method does not require an extra state of the ONU activation state machine. Instead, the semantics a conventional Serial_Number state has to be modified to allow an ONU to respond to a discovery (serial number) grant only when it has tuned to a valid activation channel and has accumulated sufficient burst profile information.

In some implementations, a multi-wavelength passive optical network (MW-PON) system includes an optical distribution network (ODN), a plurality of optical line terminations (OLTs) and a plurality of optical network units (ONUs). Depending on network topology, the ODN may include a trunk fiber, one or more branching elements and one or more distribution fibers. The plurality of OLTs is communicatively coupled via a wavelength multiplexer (WM) to the trunk fiber of the ODN. Each OLT has an associated bi-directional wavelength channel comprising a single downstream and a single upstream wavelength (same for time domain multiplexing, different for frequency domain multiplexing). The OLT supports a specific downstream rate and one or more distinct upstream line rates. Each ONU from the plurality of ONUS is communicatively attached to a respective distribution fiber. Each ONU is tunable over a corresponding range of downstream wavelengths and a corresponding range of upstream wavelengths. Each ONU is configured to perform data communication using a specific downstream line rate and a specific upstream line rate. As discussed above, each OLT is configured to assemble a broadcast management message conveying information about bi-direction wavelength channels in the MW-PON system, called a channel map message. The channel map message includes information not just about the wavelengths for which the OLT is actively performing downstream transmissions or upstream receptions, but wavelengths being used by other OLTs in the ODN also. Each OLT is further configured to transmit the channel map message downstream over its downstream transmission wavelength.

In some implementation, at least one of the ONUS includes the ability module to receive, process, store, and update a local copy of the information conveyed by said channel map message. In some embodiments, the channel map message includes information about the number of supported wavelength channels. In some implementations, the channel map message includes information on the currently operational upstream and downstream wavelengths for each supported bi-directional wavelength channel. In some implementations, the channel map message includes information on the possible upstream and downstream wavelengths for each supported bi-directional wavelength channel (some of these channels may not be currently operational, as indicated by the channel map).

In some implementations, a process of activation of ONU includes tuning range scanning, channel map acquisition, parameter learning, discovery, and ranging, wherein the content of the parameter learning, discovery, and ranging phase is largely identical to the content of the respective activation phase in a conventional single-channel PON system such as G.984 G-PON or G.987 XG-PON. In some implementations, the phase of tuning range scanning comprises the ONU operation of scanning through the supported range of downstream wavelengths in the search for an initialization channel, said initialization channel being a bi-directional wavelength channel where a downstream signal is present whose protocol and downstream line rate matches the supported protocol and downstream line rate of the ONU. In some implementations, the channel map acquisition phase contains the ONU operation of receiving and processing the channel map messages with the goal of finding at least one valid activation channel and determining whether the initialization channel is a valid activation channel; a valid activation channel being a bi-directional wavelength channel whose downstream and upstream wavelengths are within the respective tuning ranges of the ONU, whose protocol and downstream line rate matches the supported protocol and downstream line rate of the ONU, whose supported upstream line rates include the supported line rate of the ONU, and on which the activation procedure is supported. In some implementations, wherein the channel map acquisition phase further comprises a decision step, which verifies whether the initialization channel is a valid activation channel and which, if it is not the case, includes retuning to a valid activation channel.

Figure 7:
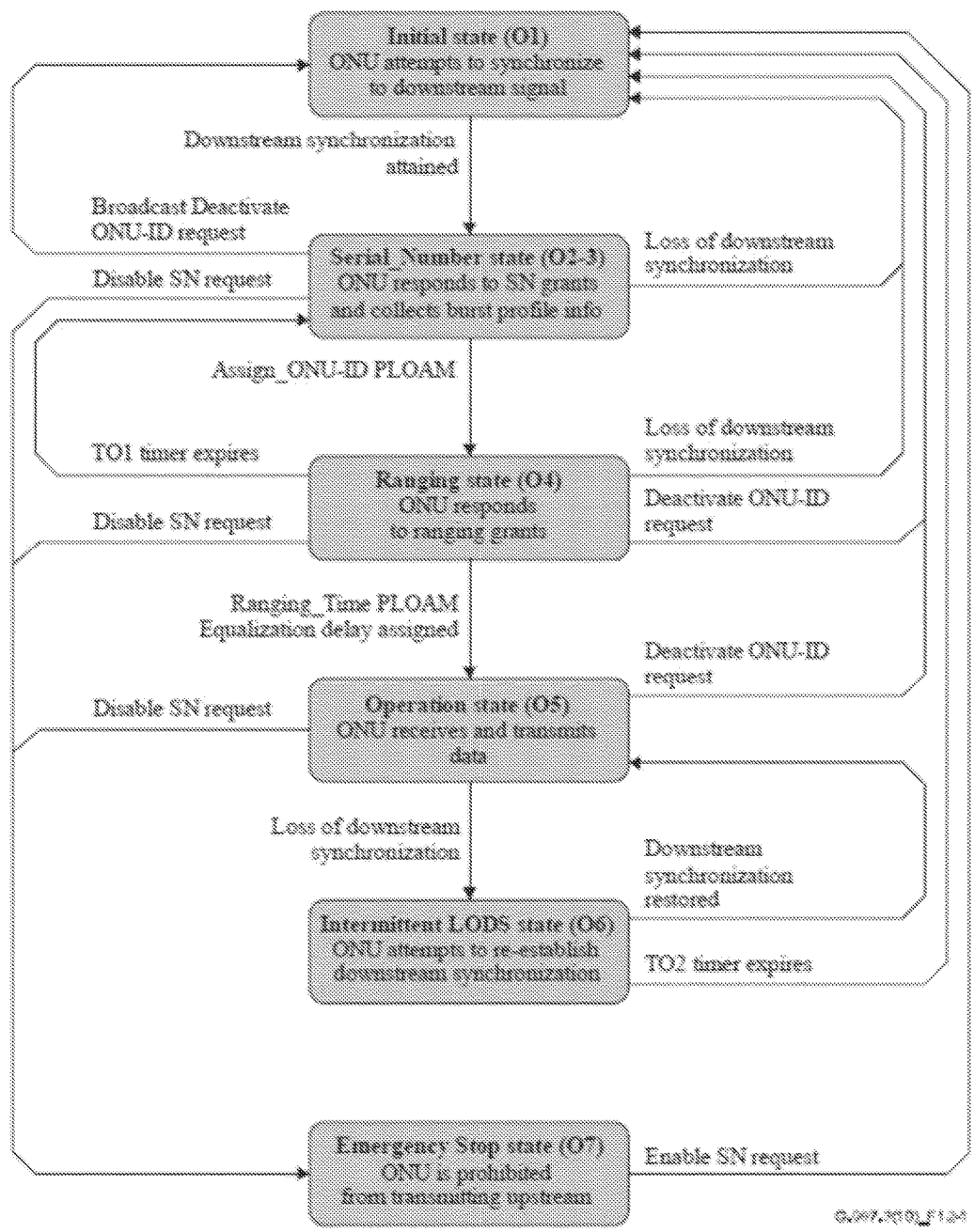
FIG. 7 is a flowchart representation of a process of acquiring an optical channel.

FIG. 7 depicts a state machine that represents current implementation, as outlined in the G.989 specification. It may be appreciated that a tuning range scanning phase would be useful to find a first working channel for an ONU. Once synchronization is attained, a channel map and corresponding burst parameters can be learnt. If there is no valid activation channel (i.e., a channel that has an upstream wavelength within tuning range of the ONU, has a matching upstream line rate and has its activation flag set to on) at the tuned working channel, then the burst profile is discarded and next working channel is tested. In some implementations, the ONU may need to tune to at most two working channels before discovery phase is started. As can be seen from FIG. 7, all of the above steps can be accomplished by operating within the state machine outlined in FIG. 7. In other words, existing ONUS may be code upgraded to work with the new MW-ODNs with minimal changes to the code implemented on these ONUS for state machine operation.

Figure 10:
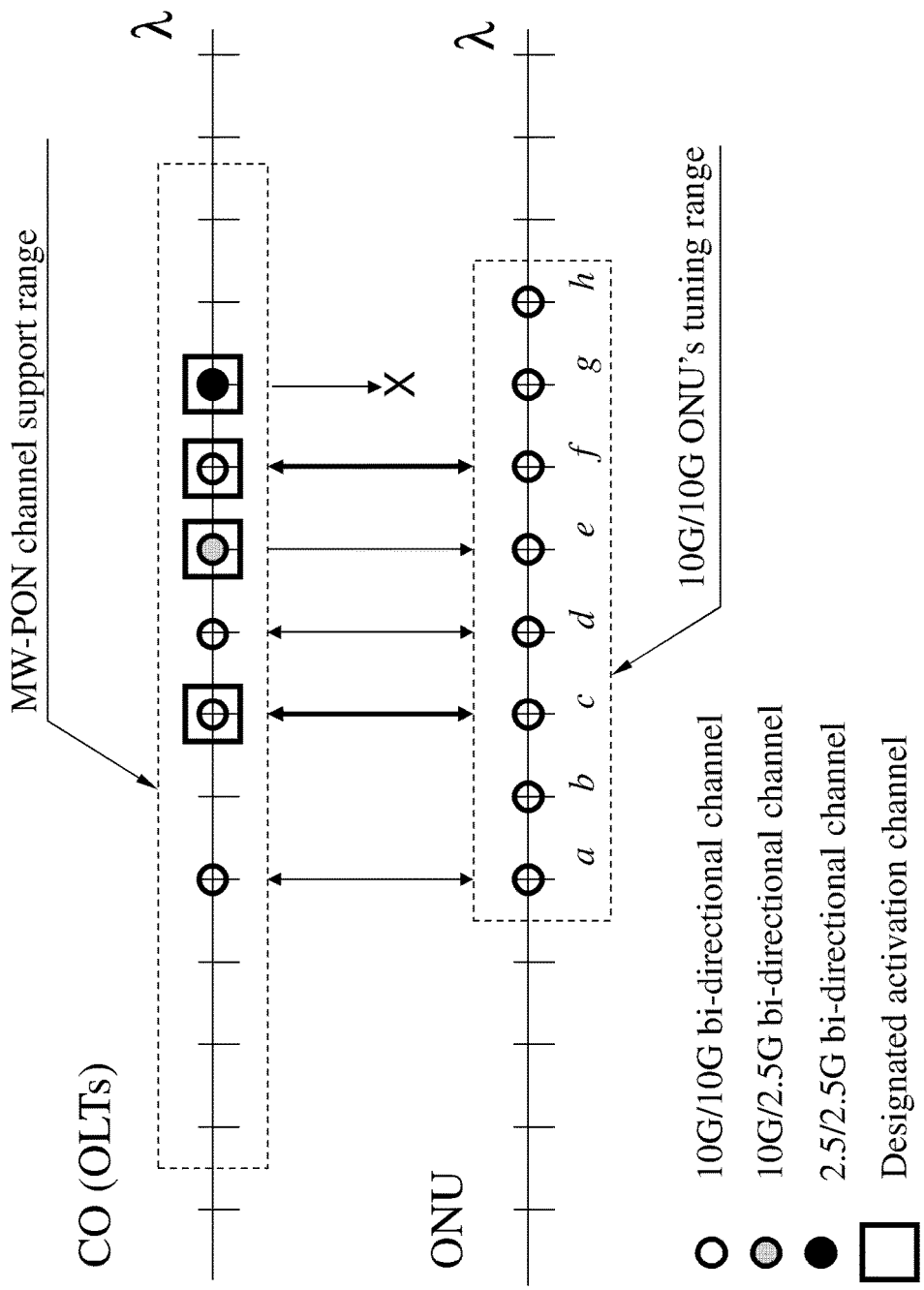
FIG. 10 illustrates available wavelengths in an optical data network.

In a specific example of application of these techniques, a wavelength map of channels available within a network is depicted in FIG. 10. In this example, the different channels include some 10 Gb upstream/10 Gb downstream channels, some 10 Gb downstream, 2.5G upstream channels and some 2.5 Gb downstream/2.5 Gb upstream channels. As can be seen, multiple channels may be designated as activation channels, but depending on the line rates supported by the ONU, some ONUS may be able to activate only using one activation channel (e.g., 2.5G/2.5G ONU can use only the highest wavelength (solid-filled circle) activation channel.

Figure 8:
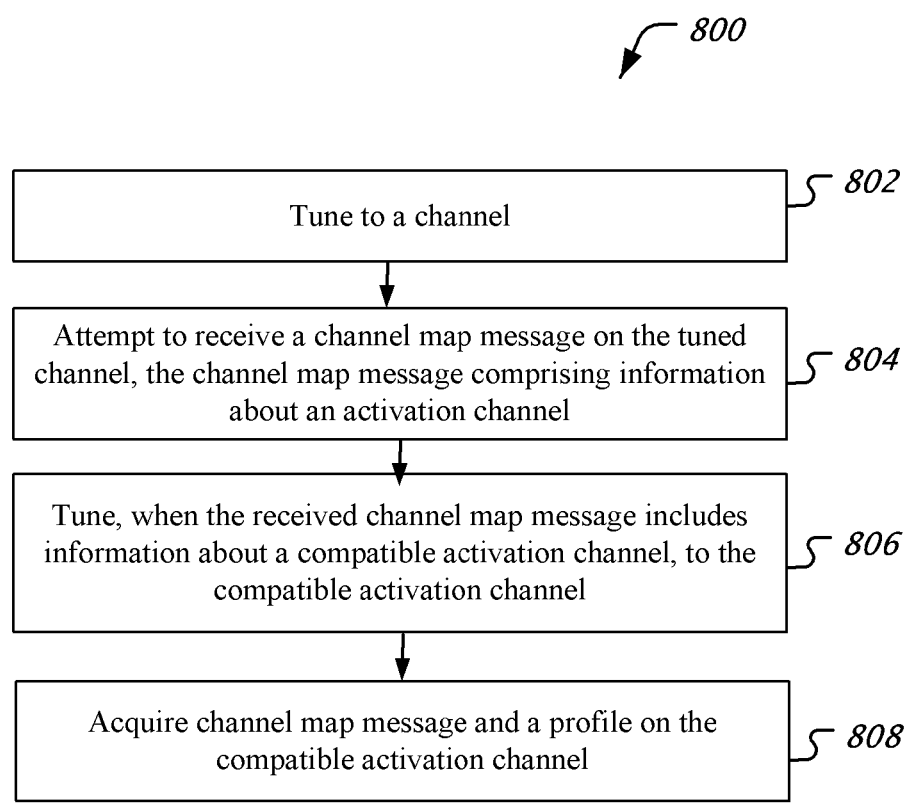
FIG. 8 is a flowchart representation of a process of optical communication.

FIG. 8 is a flowchart representation of a process 800 of activating an ONU for operation in an ODN. At 802, the ONU tunes to a working channel. At 804, the ONU attempts to receive a channel map message on the tuned channel, the channel map message comprising information about an activation channel. At 806, the ONU tunes, when the received channel map message includes information about a compatible activation channel, to the compatible activation channel. At 808, the ONU acquires the channel map message and a profile on the compatible activation channel.

Figure 9:
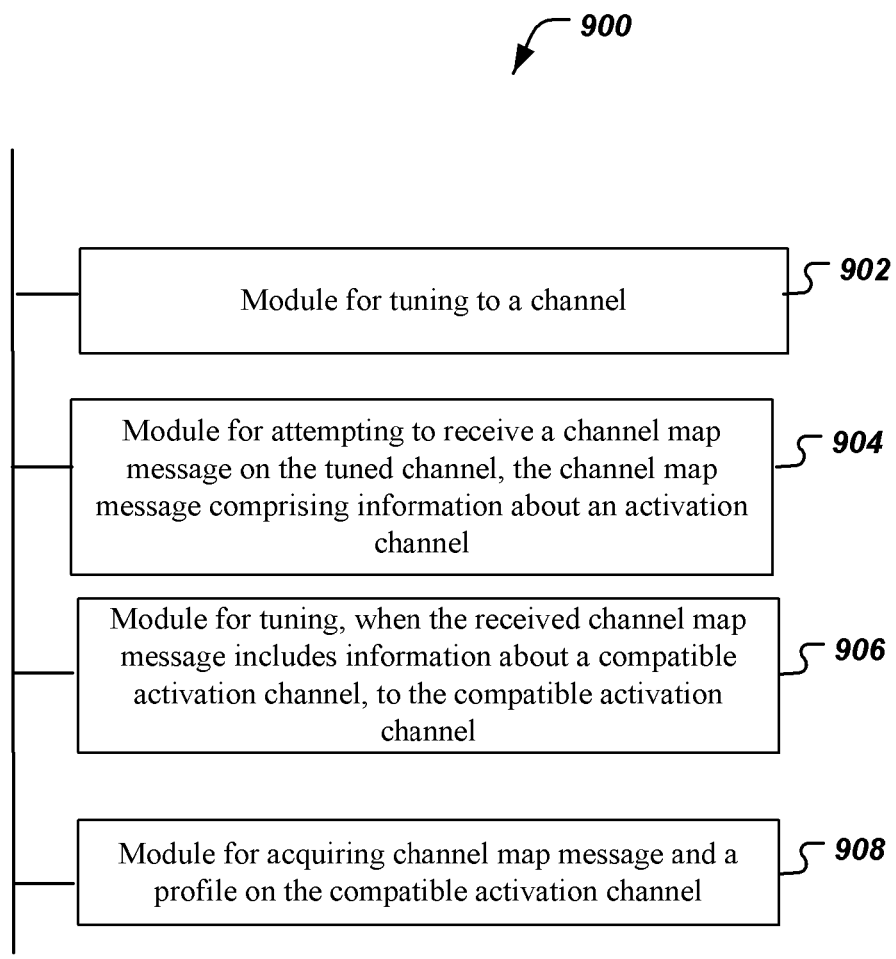
FIG. 9 is a block diagram representation of an optical receiver apparatus.

FIG. 9 is a block diagram representation of an apparatus 900 for optical communication. The module 902 is for tuning to a working channel. The module 904 is for attempting to receive a channel map message on the tuned channel, the channel map message comprising information about an activation channel. The module 906 is for tuning, when the received channel map message includes information about a compatible activation channel, to the compatible activation channel. The module 908 is for acquiring channel map message and a profile on the compatible activation channel.

In some implementations, an optical network unit includes a tuner module that tunes to a working optical channel, a channel map receiver module that attempts to receive a channel map message on the tuned channel, the channel map message comprising information about an activation channel, an activation channel module that tunes, when the received channel map message includes information about a compatible activation channel, to the compatible activation channel, and a parameter acquisition module that acquires channel map message and a profile on the compatible activation channel.

In some implementations, as disclosed above, an optical communication equipment for operation in an optical communication network includes a channel map module configured to generate a channel map for inclusion in a channel map message, the channel map listing activation channels available in the optical communication network and a channel map transmitter configured to periodically transmit the channel map message in a downstream direction in the optical communication network.

A few embodiments have been described in detail above, and various modifications are possible. The disclosed subject matter, including the various modules and functional operations described in this document, can be implemented in electronic circuitry, computer hardware, firmware, software, or in combinations of them, such as the structural means disclosed in this document and structural equivalents thereof, including potentially a program operable to cause one or more data processing apparatus to perform the operations described (such as a program encoded in a computer-readable medium, which is a non-transitory medium which retains information recorded therein. Examples of such media include, e.g., a memory device, a storage device, a machine-readable storage substrate, or other physical, machine-readable medium, or a combination of one or more of them).

The term "apparatus" encompasses apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A method implemented at an optical network unit (ONU) for joining an optical distribution network (ODN), comprising:
    scanning a tuning range of the ONU to find a signal transmitted over a first channel, wherein finding the signal indicates that the first channel is compatible with the ONU;
    tuning to the first channel;
    receiving a channel map message and a profile message on the first channel, the channel map message comprising an identifier for the first channel and a plurality of entries for activation channels, wherein the plurality of entries includes at least an entry for the first channel;
    acquiring, based on a determination that the first channel is a compatible activation channel using the plurality of entries for activation channels, a channel map and a profile on the first channel based on the channel map message and the profile message; and
    discarding, based on a determination that the first channel is an incompatible activation channel using the plurality of entries for activation channels, the acquired profile and tuning to a compatible activation channel selected from the activation channels.

2. The method of claim 1, further comprising examining a downstream line rate and a supported protocol of the first channel.

3. The method of claim 1, further comprising:
    synchronizing to the signal over the first channel.

4. The method of claim 1, wherein the channel map message includes a value indicative of a number of wavelength channels supported by the ODN.

5. The method of claim 1, wherein each entry of the plurality of entries for activation channels includes a downstream wavelength and a downstream line rate of an activation channel corresponding to the entry.

6. The method of claim 1, wherein each entry of the plurality of entries for activation channels includes an upstream wavelength, an upstream line rate, and an indication of availability of an activation channel corresponding to the entry.

7. An optical network unit (ONU) operable to join an optical distribution network (ODN), comprising:
one or more memories that store code; and
a processor that reads code from the one or more memories to:
scan a tuning range of the ONU to find a signal transmitted over a first channel, wherein finding the signal indicates that the first channel is compatible with the ONU;
tune to the first channel;
receive a channel map message and a profile information message on the first channel, the channel map message comprising an identifier for the first channel and a plurality of entries for activation channels, wherein the plurality of entries includes at least an entry for the first channel;
acquire, based on a determination that the first channel is a compatible activation channel using the plurality of entries for activation channels, a channel map and profile information on the first channel based on the channel map message and the profile message; and
discarding, based on a determination that the first channel is an incompatible activation channel using the plurality of entries for activation channels, the acquired profile information and tuning to a compatible activation channel among the one or more activation channels.

8. The optical network unit of claim 7, wherein the processor further examines a downstream line rate and a supported protocol of the first channel.

9. The optical network unit of claim 7, wherein the processor further performs:
synchronizing to the signal over the first channel.

10. The optical network unit of claim 7, wherein the channel map message includes a value indicative of a number of wavelength channels supported by the ODN.

11. The optical network unit of claim 7, wherein each entry of the plurality of entries for activation channels includes a downstream wavelength and a downstream line rate of an activation channel corresponding to the entry.

12. The optical network unit of claim 7, wherein each entry of the plurality entries for activation channels includes an upstream wavelength, an upstream line rate, and an indication of availability of an activation channel corresponding to the entry.

* * * * *